(12) United States Patent
Chominski

(10) Patent No.: US 10,347,414 B2
(45) Date of Patent: Jul. 9, 2019

(54) METHOD AND SYSTEM FOR WINDING TRANSFORMERS TO MAXIMIZE SYMMETRY OF THE PRIMARY AND SECONDARY COILS

(71) Applicant: Maxlinear, Inc., Carlsbad, CA (US)

(72) Inventor: Paul Chominski, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 205 days.

(21) Appl. No.: 15/154,451

(22) Filed: May 13, 2016

(65) Prior Publication Data
US 2016/0336108 A1 Nov. 17, 2016

Related U.S. Application Data

(60) Provisional application No. 62/161,679, filed on May 14, 2015.

(51) Int. Cl.
| | | |
|---|---|---|
| H01F 27/28 | (2006.01) | |
| H04B 1/40 | (2015.01) | |
| H01F 21/12 | (2006.01) | |
| H01F 41/07 | (2016.01) | |

(52) U.S. Cl.
CPC ......... *H01F 27/2823* (2013.01); *H01F 21/12* (2013.01); *H01F 41/07* (2016.01); *H04B 1/40* (2013.01)

(58) Field of Classification Search
CPC ........ H01F 5/00; H01F 27/28; H01F 27/2823; H01F 27/29
USPC .................................................. 336/200, 232
See application file for complete search history.

(56) References Cited

U.S. PATENT DOCUMENTS

| | | | | |
|---|---|---|---|---|
| 5,742,213 A | * | 4/1998 | Reynolds ................. | H03H 7/42 333/131 |
| 2002/0057164 A1 | * | 5/2002 | Jin .......................... | H01F 38/14 336/115 |
| 2007/0229262 A1 | * | 10/2007 | Rofougaran ....... | G06K 19/0701 340/572.1 |
| 2009/0320275 A1 | * | 12/2009 | Dobashi ............. | H02K 15/0478 29/596 |
| 2010/0052839 A1 | * | 3/2010 | Mertens ................. | H01L 23/48 336/232 |

(Continued)

FOREIGN PATENT DOCUMENTS

CN 202282235 U * 6/2012

*Primary Examiner* — Tszfung J Chan
(74) *Attorney, Agent, or Firm* — McAndrews, Held & Malloy (57) ABSTRACT

Methods and systems for winding transformers to maximize symmetry of the primary and secondary coils may comprise a transformer with a primary coil and a secondary coil. A first portion of the transformer has at least one turn around a core, and includes twisted pair sections of the primary coil and secondary coil. A second portion of the transformer may include a fractional turn extension of only the primary coil at one end of the first portion, and a third portion of the transformer may include a fractional turn extension of only the secondary coil at an opposite end of the first portion, where the fractional turn extensions area equal in length. A center tap may be coupled to the first portion of the transformer, which may be a balun. The transformer may comprise an off-chip transformer that includes wires wound around a magnetic core.

20 Claims, 4 Drawing Sheets

(56) References Cited

U.S. PATENT DOCUMENTS

2010/0109827 A1* 5/2010 Asou .................. H01F 17/045
336/192
2013/0015719 A1* 1/2013 Jung .................. H04B 5/0037
307/104

* cited by examiner

METHOD AND SYSTEM FOR WINDING TRANSFORMERS TO MAXIMIZE SYMMETRY OF THE PRIMARY AND SECONDARY COILS

CROSS-REFERENCE TO RELATED APPLICATIONS/INCORPORATION BY REFERENCE

This application makes reference to and claims priority to U.S. Provisional Application Ser. No. 62/161,679 filed on May 14, 2015. The above identified application is hereby incorporated herein by reference in its entirety.

FIELD

Certain embodiments of the invention relate to semiconductor devices. More specifically, certain embodiments of the invention relate to a method and system for winding transformers to maximize symmetry of the primary and secondary coils.

BACKGROUND

Conventional approaches for winding transformers may be costly, cumbersome, and/or inefficient—e.g., they may be complex and/or time consuming, and/or may introduce asymmetry. Further limitations and disadvantages of conventional and traditional approaches will become apparent to one of skill in the art, through comparison of such systems with some aspects of the present disclosure as set forth in the remainder of the present application with reference to the drawings.

Further limitations and disadvantages of conventional and traditional approaches will become apparent to one of skill in the art, through comparison of such systems with the present invention as set forth in the remainder of the present application with reference to the drawings.

BRIEF SUMMARY

A system and/or method for winding transformers to maximize symmetry of the primary and secondary coils substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION

Certain aspects of the disclosure may be found in winding transformers to maximize symmetry of the primary and secondary coils. Exemplary aspects of the invention may comprise: in an electronic device comprising a transformer, receiving an input electrical signal at a first voltage, and generating an output signal proportional to the input electrical signal. The transformer may comprise a primary coil and a secondary coil, where a first portion of the transformer comprises at least one turn around a core, and where the at least one turn comprises twisted pair sections of the primary coil and secondary coil. A second portion of the transformer comprises a fractional turn extension of only the primary coil at one end of the first portion, and a third portion of the transformer comprises a fractional turn extension of only the secondary coil at an opposite end of the first portion, where the fractional turn extension of the secondary coil is equal in length to the fractional turn extension of the primary coil. A center tap may be coupled to the primary coil and secondary coil in the first portion of the transformer. The transformer may be a balun. The transformer may comprise an off-chip transformer that includes wires wound around a magnetic core. The transformer may comprise an on-chip transformer with conductive and insulating layers on a semiconductor die. The transformer may be in a wireless communication device. The second and third portions of the transformer each may comprise a half turn in length, wherein a full turn is a length of one turn around the core. The first portion of the transformer may comprise bifilar twisted primary and secondary coils.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1:
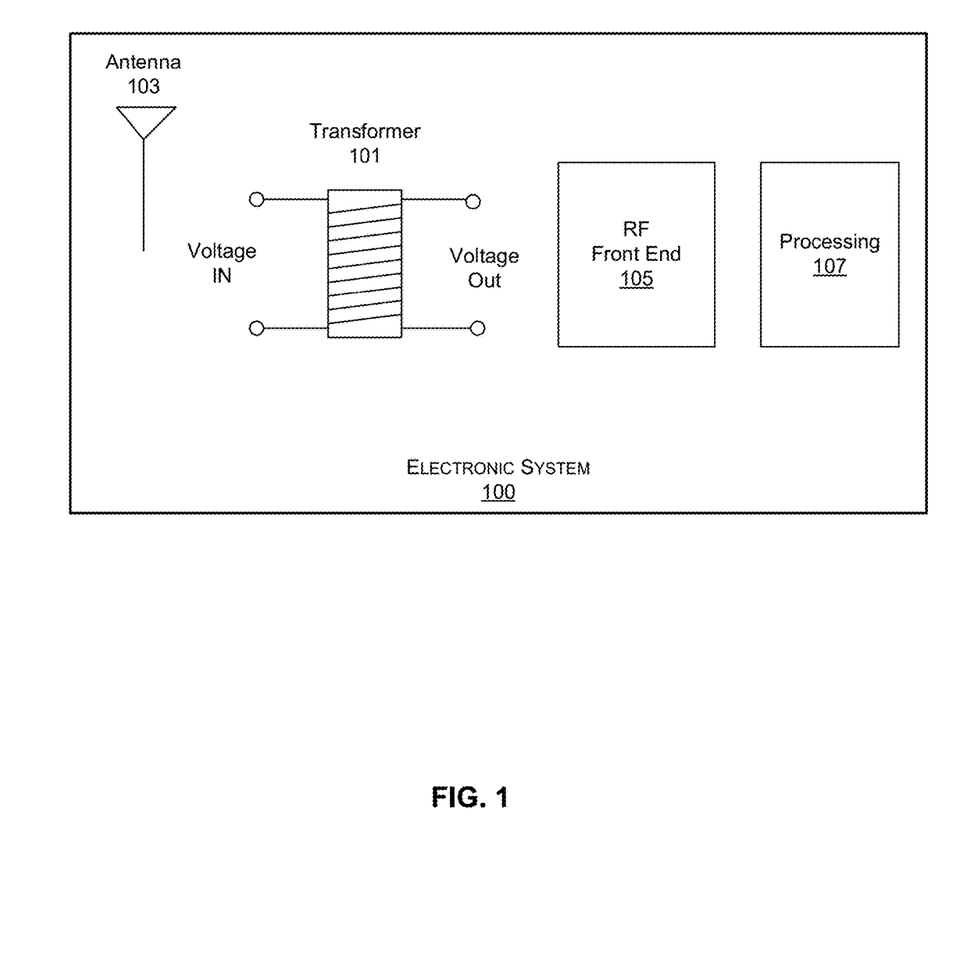
FIG. 1 illustrates an example electronic system that may utilize a transformer, in accordance with an example embodiment of the disclosure.

FIG. 1 illustrates an example electronic system that may utilize a transformer, in accordance with an example embodiment of the disclosure. Referring to FIG. 1, there is shown an electronic system 100 with a transformer 101, an antenna 103, a radio frequency (RF) front end 105, and processing module 107. The transformer 101 may comprise a balun, for example, with primary and secondary coils wound around a magnetic core and may be operable to convert balanced signals to unbalanced signals and vice versa. However, the transformer 101 is not limited to a balun application, but may be utilized in any application where a transformer is needed, such as step-up or step-down transformers, or isolators, for example.

The antenna 103 may comprise one or more antenna elements that are operable to receive wireless RF signals for processing by the RF front end 105 and the processing module 107 in the electronic system 100. In another example scenario, the antenna 103 may be operable to transmit wireless RF signals generated by the processing module 107.

The RF front end 105 may comprise amplification, mixing, filtering, and analog-to-digital or digital-to-analog conversion functions, for example, and therefore may comprise low-noise amplifiers, programmable-gain amplifiers, power amplifiers, low-pass, band-pass, and high-pass filters, analog-to-digital converters (ADCs), and digital-to-analog converters (DACs).

The electronic system 100 may comprise suitable circuitry for implementing various aspects of the present disclosure. The electronic system 100 may be configured to support performing, executing or running various operations, functions, applications and/or services. The electronic system 100 may be used, for example, in executing computer programs, playing video and/or audio content, gaming, performing communication applications or services (e.g., Internet access and/or browsing, email, text messaging, chatting and/or voice calling services), providing networking services (e.g., WiFi hotspot, Bluetooth piconet, Ethernet networking, cable or satellite systems, and/or active 4G/3G/ femtocell data channels), or the like.

In some instances, the electronic system 100 may enable and/or support communication of data. In this regard, the electronic system 100 may need to communicate with other systems (local or remote), such as during executing, running, and/or performing of operations, functions, applications and/or services supported by the electronic system 100. For example, the electronic system 100 may be configured to support (e.g., using suitable dedicated communication components or subsystems) use of wired and/or wireless connections/interfaces, which may be configured in accordance with one or more supported wireless and/or wired protocols or standards, to facilitate transmission and/or reception of signals (carrying data) to and/or from the electronic system 100. In this regard, the electronic system 100 may be operable to process transmitted and/or received signals in accordance with applicable wired or wireless protocols.

Examples of wireless standards, protocols, and/or interfaces that may be supported and/or used by the electronic system 100 may comprise wireless personal area network (WPAN) protocols, such as Bluetooth (IEEE 802.15); near field communication (NFC) standards; wireless local area network (WLAN) protocols, such as WiFi (IEEE 802.11); cellular standards, such as 2G/2G+ (e.g., GSM/GPRS/ EDGE, and IS-95 or cdmaOne) and/or 2G/2G+ (e.g., CDMA2000, UMTS, and HSPA); 4G standards, such as WiMAX (IEEE 802.16) and LTE; Ultra-Wideband (UWB), and/or the like.

Examples of wired (and in some cases wireless) standards, protocols, and/or interfaces that may be supported and/or used by the electronic system 100 may comprise Ethernet (IEEE 802.3), Fiber Distributed Data Interface (FDDI), Integrated Services Digital Network (ISDN), cable television and/or internet access standards (e.g., ATSC, DVB-C, DOCSIS, etc.), in-home distribution standards such as Multimedia over Coax Alliance (MoCA), and Universal Serial Bus (USB) based interfaces.

Examples of signal processing operations that may be performed by the electronic system 100 comprise, for example, filtering, amplification, analog-to-digital conversion and/or digital-to-analog conversion, up-conversion/ down-conversion of baseband signals, encoding/decoding, encryption/decryption, and/or modulation/demodulation.

In some instances, the electronic system 100 may be configured to enable or support input/output operations, such as to allow user interactions that may be needed for controlling the electronic system 100 or operations thereof (e.g., to allow operators to provide input or commands for controlling location specific marketing, or obtain output or feedback pertaining to it). In this regard, the electronic system 100 may comprise components or subsystems for enabling interactions with a user (e.g., end-user or installer), so as to obtain user input and/or to provide user output.

In some instances, the electronic system 100 may enable or support input/output operations, such as to allow providing output to and/or obtaining input from user(s) of the electronic system 100. In this regard, the electronic system 100 may comprise components or subsystems for enabling obtaining user input and/or to provide output to the user. For example, the electronic system 100 may enable or support input/output operations for allowing user interactions which may be needed for controlling the electronic system 100 or operations thereof (e.g., allowing operators to provide input or commands for controlling certain functions or components, to output or provide feedback pertaining, etc.). Also, the electronic system 100 may be operable to support input and/or output of multimedia data. For example, the electronic system 100 may enable or support generating, processing, and/or outputting of video and/or acoustic signals, such as via suitable output devices or components (e.g., displays, loudspeakers, etc.). In this regard, the output signals may be generated based on content, which may be in digital form (e.g., digitally formatted music or the like). Similarly, the electronic system 100 may enable or support capturing and processing of video and/or acoustic signals, such as via suitable input devices or components (e.g., cameras, microphones, etc.), to generate (e.g., to store or communicate) corresponding data. The corresponding data may be in digital form (e.g., digitally formatted music, video, or the like).

The electronic system 100 may be a stationary system (i.e. being installed at, and/or configured for use only in particular location). In other instances, however, the electronic system 100 may be a mobile device—i.e. intended for use on the move and/or at different locations. In this regard, the electronic system 100 may be designed and/or configured (e.g., as handheld device) to allow for ease of movement, such as to allow it to be readily moved while being held by the user as the user moves, and the electronic system 100 may be configured to perform at least some of the operations, functions, applications and/or services supported on the move.

Examples of electronic systems may comprise handheld electronic devices (e.g., cellular phones, smartphones, or tablets), computers (e.g., laptops, desktops, or servers), dedicated media devices (e.g., televisions, game consoles, or portable media players, etc.), set-top boxes (STBs) or other similar receiver systems, and the like. The disclosure, however, is not limited to any particular type of electronic system.

In operation, the electronic system 100 may be operable to perform various operations, functions, applications and/or services. For example, in some instances, electronic system 100 may be operable to transmit and/or receive RF signals via the antenna 103. In some instances, the antenna 103 may provide an unbalanced RF signal, i.e., between a trace and ground while the receiver circuitry in the RF front end 105 is configured for balanced signals. In this instance, the balun 101 may be utilized to convert the received unbalanced signal to a balanced signal.

In this regard, the transformer 101 may comprise suitable circuitry, interfaces, logic, and/or code for receiving an unbalanced input voltage and generating a balanced output voltage that is proportional to the input voltage. The transformer 101 may be utilized, during transmitting or receiving of radio frequency (RF) signals, so may instead convert balanced signals from the RF front end 105 and convert them to unbalanced signals for transmission by the antenna 103. The disclosure, however, is not limited to any particular use scenario, and may be utilized in any appropriate setup performing or requiring a transformer. The transformer 101 may comprise an off-chip transformer comprising coils around or a core, or may instead comprise a multi-layer on-chip transformer comprising conductive and insulating layers for the windings and core.

Figure 2:
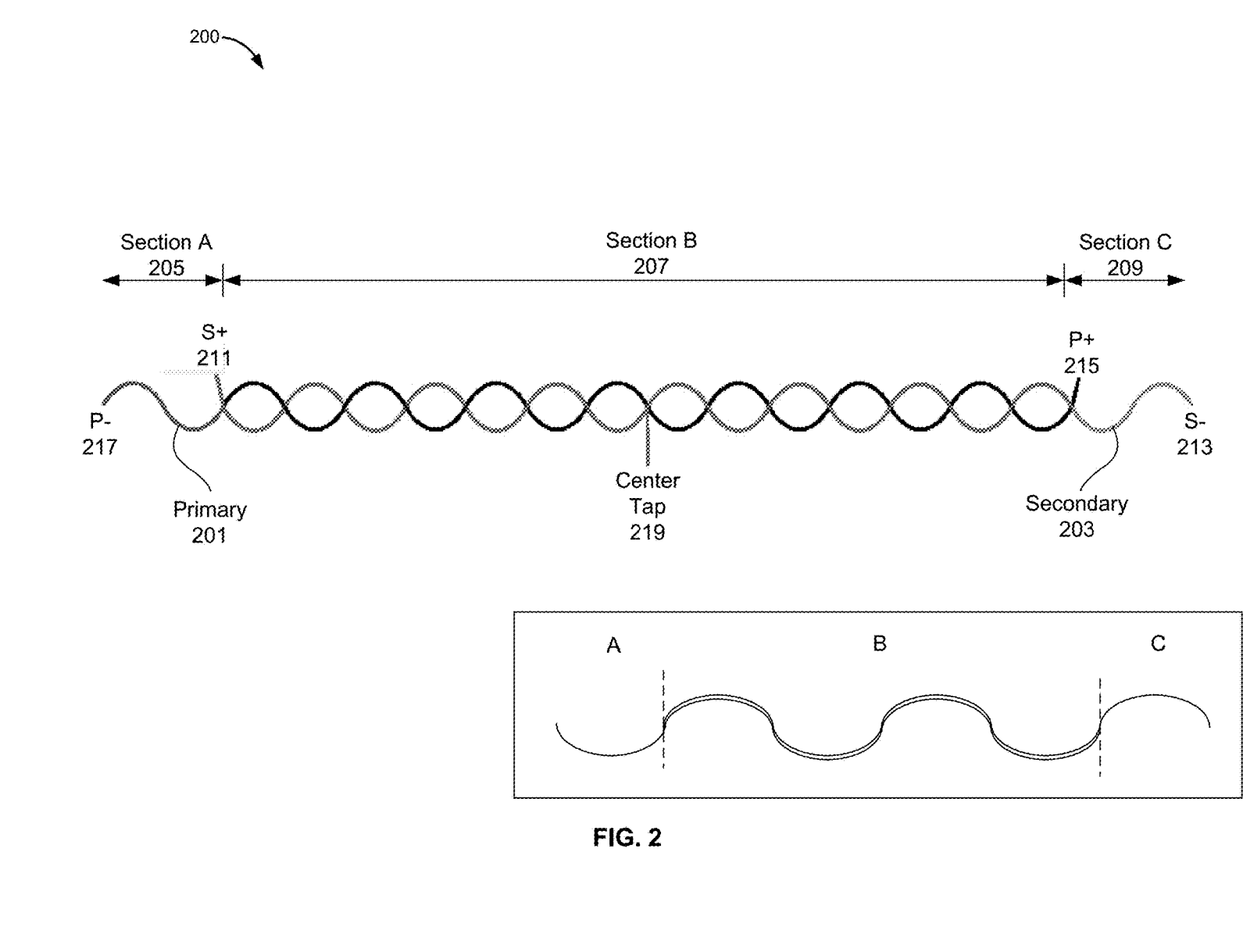
FIG. 2 illustrates an example primary and secondary coil winding in a transformer, in accordance with an example embodiment of the disclosure.

FIG. 2 illustrates an example primary and secondary coil winding in a transformer, in accordance with an example embodiment of the disclosure. Shown in FIG. 2 is an illustration of a transformer 200 comprising a primary winding 201 and a secondary winding 203 in winding sections A 205, B 207, and C 209. The illustrated winding structure may maximize the symmetry of the primary and secondary coils 201 and 203, wherein the primary and secondary windings form a twisted pair for a number of turns in section B 203, followed by a fractional turn winding of only the primary wire on one end of the winding in section A 205, and a similar fractional turn winding of only the secondary wire on the opposite end of the winding in section C 209.

The twisted pair winding technique ensures tight coupling and symmetry between primary and secondary windings while also reducing asymmetric parasitics. The fractional turns on either end of the winding allow the primary and secondary connections to emerge on opposite sides of the transformer for better physical connection. A center tap 219 may be easily added on either or both the primary and secondary windings as shown.

In the example shown, 3.5 turns of both coiled windings that are coiled around each other are wound around the core and at each end, 0.5 turn of either the primary or secondary extend beyond the other, the primary on one end and the secondary on the other end. Any number N of turns may be utilized depending on core size and/or wire size, for example, where N is greater than 1. As shown, the secondary coil 203 extends beyond the end of Section B 207 in section C 209 by 0.5 turns and is terminated by connection S− 213, while the primary coil 201 terminates with terminal P+ 215 at the end of section B 207. Similarly, the primary coil 201 extends 0.5 turns beyond the end of section B 207 in section A 205 while the secondary coil terminates with terminal S+ 211 at the end of section B 207. While a 0.5 turn extension is shown in the example of FIG. 2, other fractional lengths are possible, such as ⅛, ¼, ¾, etc. . . . . Conventional windings result in different lengths resulting in asymmetry and power loss.

Section B may be bifilar twisted, as illustrated in the inset at the bottom of FIG. 2, which with the extended portions of alternating coils in Sections A 205 and B 209 result in reduced losses from asymmetry as compared to conventional coil windings. This configuration may suppress the leakage of low frequency fields between primary and secondary coils. This winding architecture is shown further with respect to FIG. 3.

Figure 3:
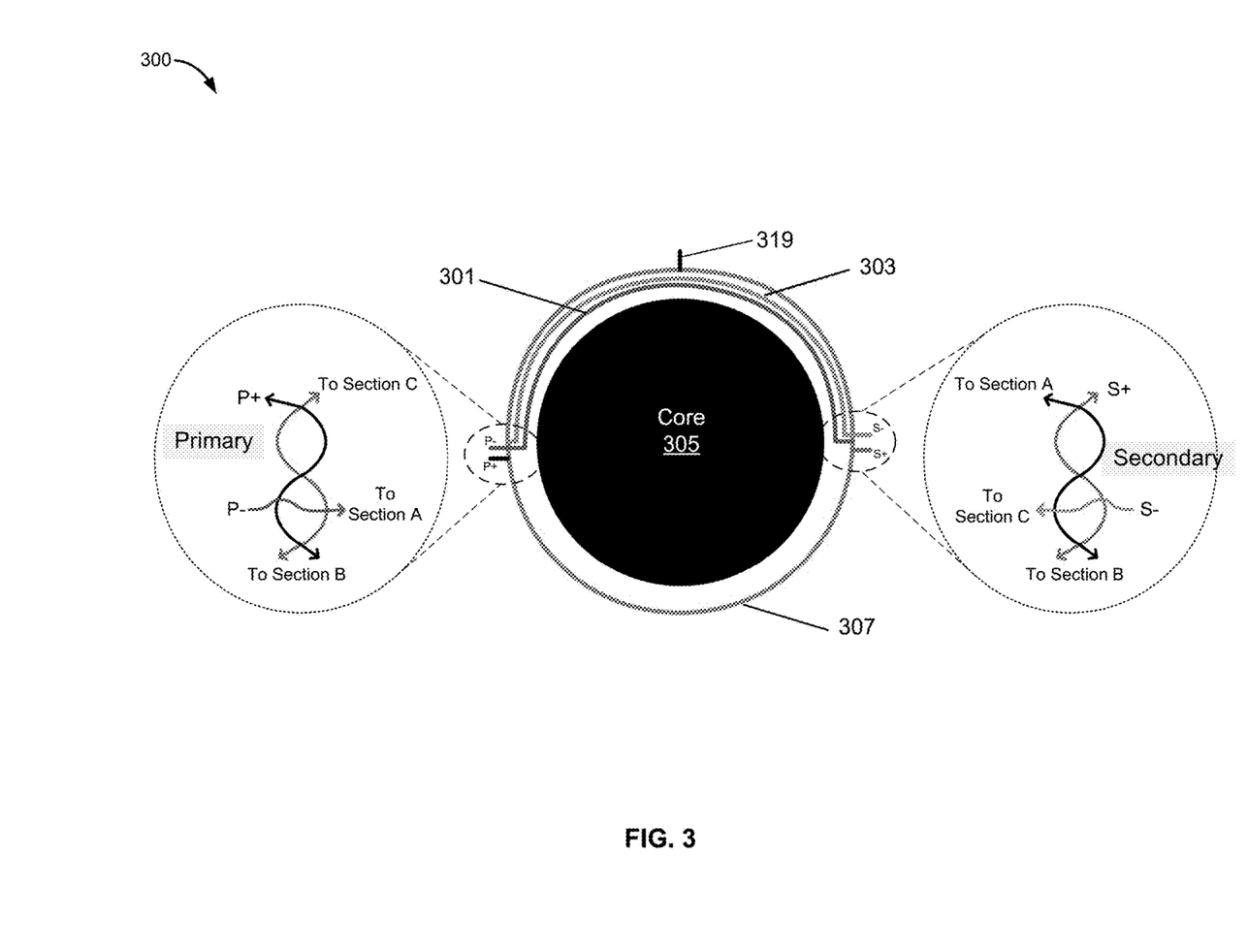
FIG. 3 illustrates a top view of an example primary and secondary coil winding, in accordance with an example embodiment of the disclosure.

FIG. 3 illustrates a top view of an example primary and secondary coil winding, in accordance with an example embodiment of the disclosure. Shown in FIG. 3 is a transformer 300 comprising a core 305 with coils wound around it. Section B from FIG. 2 is represented in FIG. 3 by Section B 307, where both the primary and secondary coils are wound around each other and around the coil. The coils in Section B 307 may comprise twisted pairs or may be bifilar as illustrated in the inset of FIG. 2. Coil extension 301 shows the extension of the primary winding 0.5 turns terminating in the terminal P− while the other end of the primary terminates at the other end of Section B at terminal P+.

Coil extension 303 shows the extension of the secondary coil beyond Section B 307 terminating in the terminal S− after the added 0.5 turns while the other end of the secondary terminates at the other end of Section B at terminal S+. The extended sections of the primary and secondary coils may also be twisted together, further improving symmetry. As stated previously, while 0.5 turn extensions are illustrated, other fractional turn extensions may be utilized, depending on the size of the core 305 and/or the geometry of the device. The winding structure illustrated in FIGS. 2 and 3 results in better frequency response and lower loss than conventional transformer windings. The transformer 300 may comprise an off-chip device which may be coupled to circuitry on a chip, but the disclosure is not so limited, as the transformer may instead be on-chip, as illustrated further with respect to FIG. 4.

Figure 4:
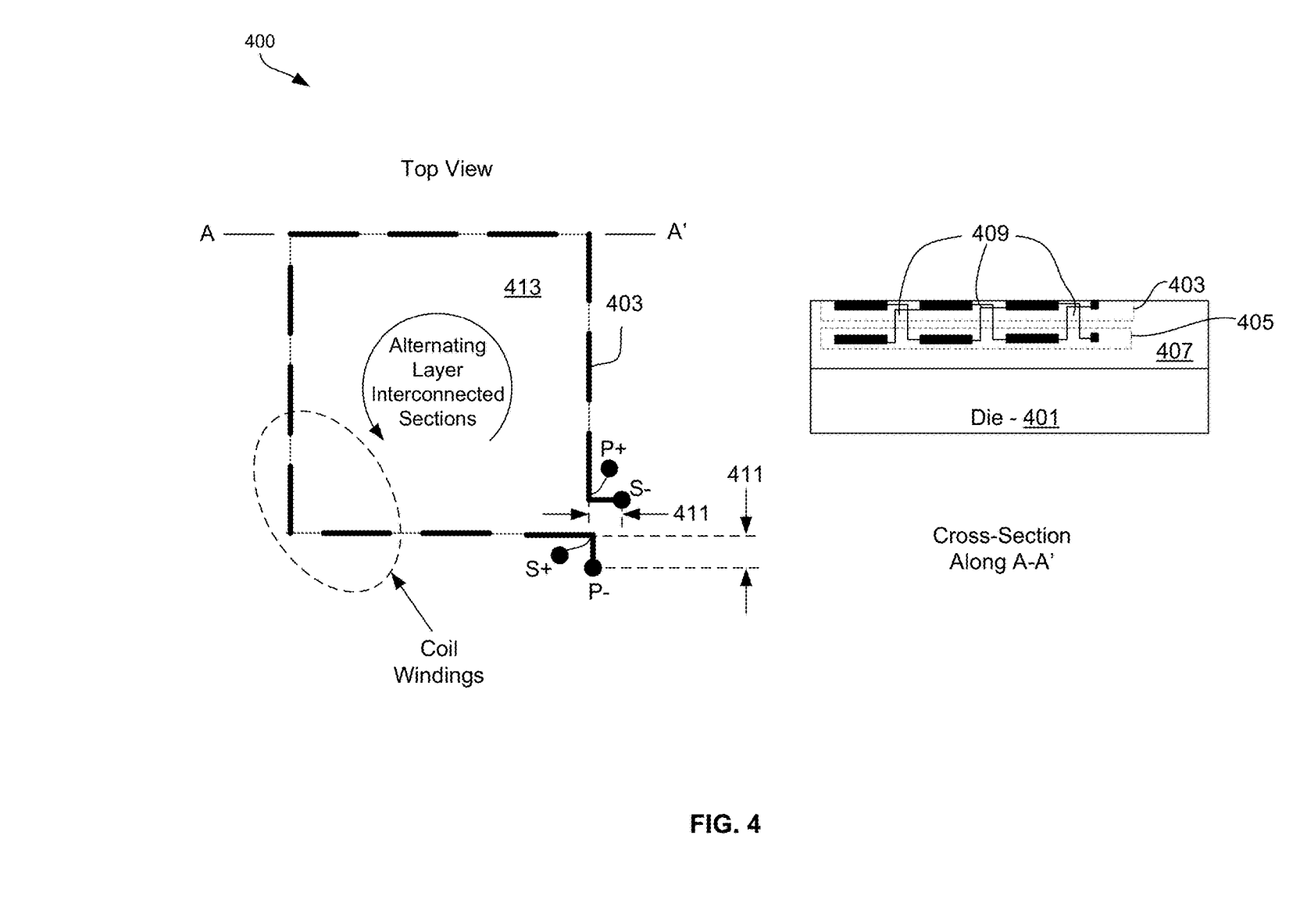
FIG. 4 illustrates top and cross-section views of an on-chip transformer with maximized winding efficiency, in accordance with an example embodiment of the disclosure.

FIG. 4 illustrates top and cross-section views of an on-chip transformer with maximized winding efficiency, in accordance with an example embodiment of the disclosure. Referring to FIG. 4, there is shown a cross-section view of transformer 400 comprising top metal layer 403, bottom metal layer 405, dielectric layer 407, and interconnection sections 409, which may all be integrated on semiconductor die 401. FIG. 4 may share any and all aspects of FIGS. 1-3. The top and bottom metal layers 403 and 405 may comprise deposited metal layers and may comprise a material used in semiconductor processing, such as copper, silver, gold, titanium, tungsten, nickel, combinations thereof, and/or similar suitable materials. The dielectric layer 407 may comprise a silicon dioxide or silicon nitride material, for example, for providing insulation between the metal layers 403/407 and adjacent sections. The interconnection sections 409 comprise conducting layers for electrically connecting alternating sections of the top and bottom metal layers 405 and 405. Vias, for example, may be utilized to provide vertical sections of the interconnection sections.

Primary and secondary windings of the transformer 400 may comprise alternating metal layer interconnected sections, such that a section of top metal layer 403 may be electrically connected to the next lateral section in the lower metal layer 405, which may continue around the device. The alternating interconnection may result in the twisted coil windings of the transformer 400. In another example embodiment, the coils may be only in a single layer each, i.e., continuous sections without the interconnections sections 409, and since the layers can be on the order of microns, the winding may thus be bifilar. The transformer 400 primary and secondary coil terminals are labeled as P+/P− and S+/S−, respectively.

The fractional extensions 411 may comprise lengths of one of the windings, primary or secondary, at each end of the coil windings, similar to the extension sections 205 and 209 in FIG. 2. The core 413 may comprise a portion of the dielectric layer 405 within the coil windings. In an example embodiment, a magnetic material is embedded within the coil windings to act as a magnetic core for the transformer 400.

In an embodiment of the disclosure, a method and system may comprise a transformer with a primary coil and a secondary coil, where a first portion of the transformer comprises at least one turn around a core, and where the at least one turn comprises twisted pair sections of the primary coil and secondary coil. A second portion of the transformer comprises a fractional turn extension of only the primary coil at one end of the first portion, and a third portion of the transformer comprises a fractional turn extension of only the secondary coil at an opposite end of the first portion, where the fractional turn extension of the secondary coils is equal in length to the fractional turn extension of the primary coil.

A center tap may be coupled to the primary coil and secondary coil in the first portion of the transformer. The transformer may be a balun. The transformer may comprise an off-chip transformer that includes wires wound around a magnetic core. The transformer may comprise an on-chip transformer with conductive and insulating layers on a semiconductor die. The transformer may be in a wireless communication device. The second and third portions of the transformer each may comprise a half turn in length, wherein a full turn is a length of one turn around the core. The first portion of the transformer may comprise bifilar twisted primary and secondary coils.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. An electronic device, the device comprising:
   a transformer comprising a primary coil and a secondary coil, wherein:
      a first portion of the transformer comprises at least one turn around a core, said at least one turn comprising twisted pair sections of the primary coil and secondary coil;
      a second portion of the transformer comprises a fractional turn extension of only the primary coil at one end of the first portion; and
      a third portion of the transformer comprises a fractional turn extension of only the secondary coil at an opposite end of the first portion, wherein the fractional turn extension of the secondary coil is equal in length to the fractional turn extension of the primary coil.

2. The electronic device according to claim 1, comprising a center tap coupled to the primary coil and secondary coil in the first portion of the transformer.

3. The electronic device according to claim 1, wherein the transformer comprises a balun.

4. The electronic device according to claim 1, wherein the transformer comprises an off-chip transformer.

5. The electronic device according to claim 4, wherein the off-chip transformer comprises wires wound around a magnetic core.

6. The electronic device according to claim 1, wherein the transformer comprises an on-chip transformer.

7. The electronic device according to claim 6, wherein the on-chip transformer comprises conductive and insulating layers on a semiconductor die.

8. The electronic device according to claim 1, wherein the transformer is in a wireless communication device.

9. The electronic device according to claim 1, wherein the second and third portions of the transformer each comprise a half turn in length, wherein a full turn is a length of one turn around the core.

10. The electronic device according to claim 1, wherein the first portion of the transformer comprises bifilar twisted primary and secondary coils.

11. A method for communication, the method comprising:
    in an electronic device comprising a transformer, the transformer comprising:
       a first portion of the transformer comprises at least one turn around a core, said at least one turn comprising twisted sections of the primary coil and secondary coil;
       a second portion of the transformer comprises a fractional turn extension of only the primary coil at one end of the first portion; and
       a third portion of the transformer comprises a fractional turn of only the secondary coil at an opposite end of the first portion, wherein the fractional turn extension of the secondary coil is equal in length to the fractional turn extension of the primary coil;
    receiving an input electrical signal at a first voltage; and
       generating an output signal proportional to the input electrical signal.

12. The method according to claim 11, wherein a center tap is coupled to the primary coil and secondary coil in the first portion of the transformer.

13. The method according to claim 11, wherein the transformer comprises a balun.

14. The method according to claim 11, wherein the transformer comprises an off-chip transformer.

15. The method according to claim 14, wherein the off-chip transformer comprises wires wound around a magnetic core.

16. The method according to claim 11, wherein the transformer comprises an on-chip transformer.

17. The method according to claim 16, wherein the on-chip transformer comprises conductive and insulating layers on a semiconductor die.

18. The method according to claim 11, wherein the transformer is in a wireless communication device.

19. The method according to claim 11, wherein the first portion of the transformer comprises bifilar twisted primary and secondary coils.

20. An electronic device comprising:
    a transformer comprising a primary coil and a secondary coil, wherein:

a first portion of the transformer comprises at least one turn around a core, said at least one turn comprising bifilar twisted sections of the primary coil and secondary coil;

a second portion of the transformer comprises a fractional turn extension of only the primary coil at one end of the first portion; and a third portion of the transformer comprises a fractional turn extension of only the secondary coil at an opposite end of the first portion, wherein the fractional turn extension of the secondary coil is equal in length to the fractional turn extension of the primary coil.

* * * * *